United States Patent

Pryor, Jr.

[15] 3,660,647
[45] May 2, 1972

[54] AUTOMATIC SIGNAL DELAY TRACKING SYSTEM

[72] Inventor: Cabell N. Pryor, Jr., Silver Spring, Md.

[73] Assignee: The United States of America as represented by the Secretary of the Navy

[22] Filed: Dec. 24, 1969

[21] Appl. No.: 887,832

[52] U.S. Cl.................................235/181, 235/153, 328/55, 328/72, 328/110, 328/133, 340/146.2, 340/347 AD
[51] Int. Cl.........................................G06f 15/34, G06f 11/00
[58] Field of Search...............235/181, 177; 340/3, 7, 347; 343/7.3, 7.7, 5, 8–13; 333/18; 328/55, 133

[56] References Cited

UNITED STATES PATENTS

| | | | |
|---|---|---|---|
| 3,249,911 | 5/1966 | Gustafsson | 235/181 X |
| 3,502,994 | 3/1970 | Ott et al. | 328/55 X |
| 3,376,411 | 4/1968 | Montani et al. | 235/181 X |
| 3,403,340 | 9/1968 | Becker et al. | 333/18 |
| 3,514,585 | 5/1970 | Norsworthy | 235/181 |
| 3,521,172 | 6/1970 | Harmon | 328/55 X |
| 3,532,867 | 10/1970 | Ricketts et al. | 235/181 |

Primary Examiner—Felix D. Gruber
Attorney—Richard S. Sciascia, J. A. Cooke and R. J. Erickson

[57] ABSTRACT

A system for varying the relative time delay between two broadband input signals consisting of an adjustable time delay coupled to one of two input channels of a two point clipper correlator. The correlator includes a plurality of cross-coupled exclusive OR gates which generate output signals only when the correlation functions of both channels correspond. Decisions made in the correlator at each sample time are used to vary the adjustable delay, to provide automatic tracking of the peak of the cross-correlation function between the input signals.

8 Claims, 2 Drawing Figures

INVENTOR
Cabell N. Pryor, Jr

AUTOMATIC SIGNAL DELAY TRACKING SYSTEM

BACKGROUND OF THE INVENTION

This invention generally relates to the art of correlation function analysis and in particular to a system for varying the relative time delay between two broadband signals.

Correlation function analysis has long been a conventional approach to signal source ranging and tracking especially in underwater operations. Prior art correlator tracking systems generally operate on the principle of sampling the signals from the source being tracked, a submarine, for example, at two separated points, and then using the samples of the signals to generate a complete correlation function over a broad range of delay periods. As is well known to those skilled in the art, the correlation function so generated has a peak at the most probable value of delay between the two sampled inputs. The position of the signal source may then be calculated in the conventional manner using the most probable value of delay represented by the peak of the calculated correlation function.

Such prior art correlator systems are inherently somewhat inefficient due to the unnecessary number of calculations they produce in generating a complete correlation function, since only a few values near the peak of the correlation function are essential to obtain the desired tracking information. In addition, these prior art correlator systems develop only one calculation of the most probable value of delay in the time interval required to generate a complete correlation function. Thus, they are relatively slow in providing range information and are inadequate for tracking targets moving at high speeds. Furthermore, the equipment required to generate complete correlation functions is ordinarily complicated, bulky and expensive.

SUMMARY OF THE INVENTION

Accordingly, one object of this invention is to provide a relatively uncomplicated signal tracker requiring calculations at only two points of a correlation function.

Another object of this invention is to provide a signal tracking system which makes tracking decisions at input sample time.

Another object of the present invention is to provide a signal tracking system that provides a rapid calculation of the most probable value of delay between two sample input signals.

Yet another object of the instant invention is to provide a signal tracking system having an increased capability to follow rapidly changing signal delays.

Briefly, these and other objects are achieved by inserting an adjustable delay into one of two sampled input channels which are coupled to a correlator having a plurality of logical gates. The logical gates are coupled to a tracking logic network which controls the adjustable delay setting. Inequalities in the numbers of logical gate output pulses cause the tracking logic to vary the adjustable delay setting until it corresponds to the desired value of delay whereby the plurality of logical gates have an equal number of output pulses.

BRIEF DESCRIPTION OF THE DRAWINGS

A more complete appreciation of the invention and many of the attendant advantages thereof will be readily appreciated as the same becomes better understood by reference to the following detailed description when considered in connection with the accompanying drawings wherein.

DESCRIPTION OF THE PREFERRED EMBODIMENT

Figure 1:
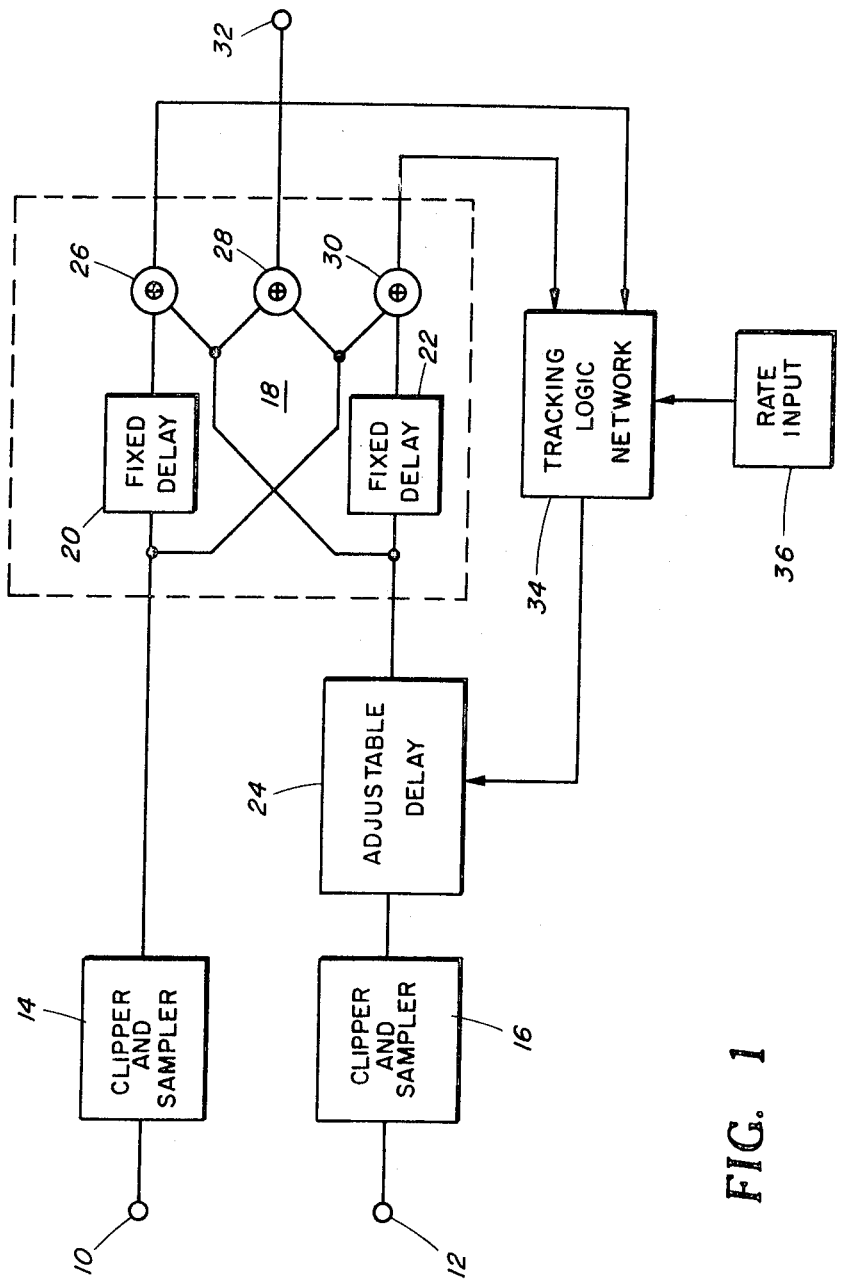
FIG. 1 is a schematic block diagram of the basic tracking system of the instant invention.

Referring now to the drawings wherein like characters designate identical or corresponding parts throughout the several views, and more particularly to FIG. 1 thereof, a first embodiment of the tracking system of the instant invention is shown as including a pair of input terminals 10 and 12 connectable to any suitable source of input signals such as transducers and which in turn are individually connected to respective ones of a pair of clipper-samplers 14 and 16. The input signals, for example, may consist of acoustic or sonic information generated by submerged or surface vessels, but immersed in background noise.

The clipper-samplers sample the signals on the input terminals at periodic intervals and clip the sample pulses retaining only quantized polarity information. Both of clipper-samplers 14 and 16 are coupled to a device 18 which includes a pair of fixed delays 20 and 22 and a trio of logic circuit gates 26, 28 and 30. An adjustable delay 24, which may be a digital shift register with an adjustable readout point, is interposed between clipper-sampler 16 and correlator 18. The logic circuit gates used preferably generate a logical one output when the signals to both of their inputs are equal and a logical zero when the input signals are unequal and thus do not conform to the ordinary definition of exclusive OR gates but could rather be defined as inverted outputs of exclusive OR gates or $\overline{\text{EX OR}}$.

One input of $\overline{\text{EX OR}}$ gate 26 is coupled to the output of fixed delay 20 and the other input thereof is coupled to the input of fixed delay 22. Similarly, one input of $\overline{\text{EX OR}}$ gate 30 is coupled to the output of fixed delay 22 and the other input thereof is coupled to the input of fixed delay 20. In turn, the inputs of $\overline{\text{EX OR}}$ gate 28 are individually coupled to the inputs of both fixed delays 20 and 22.

The underlying principle of operation of the tracking system is that the probabilities that logical one outputs will be generated by $\overline{\text{EX OR}}$ gates 26 and 30 are equally likely only if the correlogram peak, or most likely value of delay is centered on the value at which adjustable delay 24 is set. This theory assumes, of course, that the peak is symmetrical and not distorted by multi-path arrivals of input signals, and that the fixed delay does not exceed the width of the correlogram peak as determined by the signal bandwidth. If the correlogram peak, or true value of delay, is not exactly the same as that at which adjustable delay 24 is set, then the $\overline{\text{EX OR}}$ gate representing the point toward which the peak lies has a higher probability of producing an output pulse than the other $\overline{\text{EX OR}}$ gate. Therefore, by comparing the relative number of outputs from the two $\overline{\text{EX OR}}$ gates 26 and 30, the tracking logic can either increase or decrease the adjustable delay to center the correlogram peak between the two calculated correlogram points.

It will be noted that $\overline{\text{EX OR}}$ gate 28 is not essential to the tracking system of the instant invention, although its output provides an indication of the amplitude of the correlation function peak. Thus, it may be used as an indication of whether or not a target has been detected and is being tracked by the system. The output of $\overline{\text{EX OR}}$ gate 28 is coupled to a terminal 32 which may be connected to suitable electronic processing components for use whenever desirable.

$\overline{\text{EX OR}}$ gates 26 and 30 are coupled to the inputs of a tracking logic network 34 which compares the number of pulses generated by the two $\overline{\text{EX OR}}$ gates, and develops a pulse train output in response to this comparison, indicative of which of $\overline{\text{EX OR}}$ gates 26 and 30 is generating more output pulses, thereby determining whether the adjustable delay 24 is set at a value above or below the optimum setting. The output of tracking logic network 34, which need not include a memory or delay, is fed directly to adjustable delay 24 to correct its setting automatically. If the adjustable delay 24 is set at the optimum delay value the correlation function peak is centered and equal numbers of pulses are generated by $\overline{\text{EX OR}}$ gates 26 and 30, with the result that the tracking logic network generates no output.

The information output of the system is taken by reading out in any suitable manner the value at which adjustable delay 24 is set.

A rate input circuit 36, which may be a variable frequency pulse generator, is coupled to tracking logic network 34 to provide a method of scanning through a range of delays to search for possible targets.

Since the system makes a decision regarding changes in the adjustable delay as each input sample is received, its response is very rapid, but its integration time is only a single sample period. It is desirable, therefore, to make the step size of the delay changes quite small whereby the average of many small step changes produces a relatively smooth estimate of the optimum delay thereby producing an effect analogous to providing the system with an increased integration time.

Figure 2:
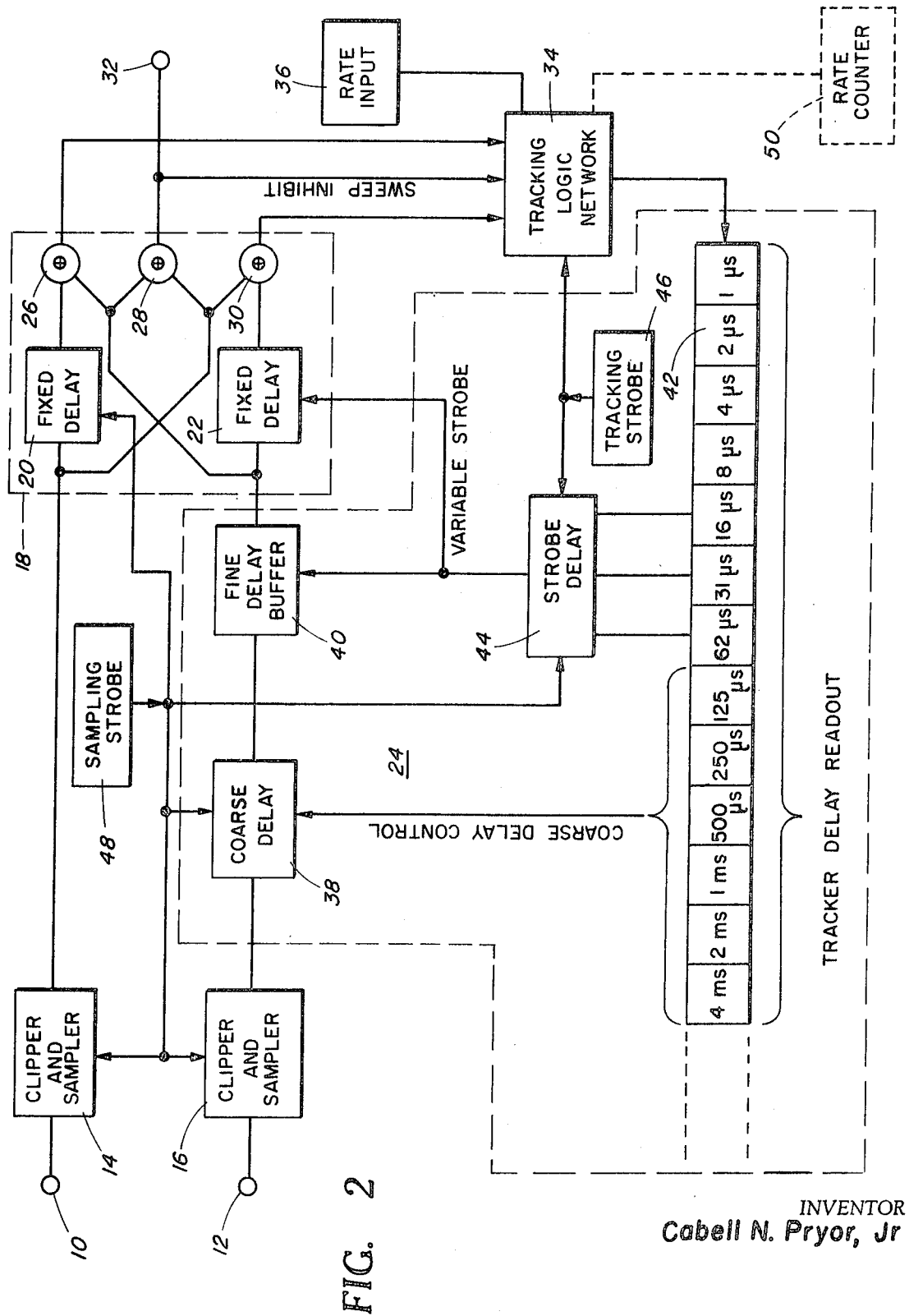
FIG. 2 is a schematic block diagram of an alternative embodiment of the tracking system of the instant invention showing use of coarse and fine delays.

Referring now to FIG. 2, there is shown an alternative embodiment of the invention in which adjustable delay 24 of FIG. 1 has been expanded to include coarse and fine delay units. More particularly, a coarse delay 38 and a fine delay buffer 40 are inserted between clipper-sampler 16 and fixed delay 22. Coarse delay 38 may be a conventional long digital delay of the type disclosed in U.S. Pat. No. 3,387,284 issued June 4, 1968 to J. C. Munson et al., and fine delay buffer 40 may be a single binary counter stage or the equivalent.

Coarse delay 38 is coupled directly to a conventional reversible binary counter 42 which both controls and provides a manner of reading out the adjustable delay setting of the system. Counter 42 is labeled with a progression of delay values based on a presumed sampling interval of, for example, 125 microseconds. Clearly, any other sampling interval also may be selected to meet the demands of a particular application.

A strobe delay 44, which may be a three stage parallel input binary counter, is coupled to a plurality of intermediate stages, preferably three, of reversible counter 42. Strobe delay 44 may be selected to have more or less than three stages depending upon the accuracy of fine delay desired.

A sampling strobe 48 is coupled to strobe delay 44 as well as to clipper-samplers 14 and 16, coarse delay 38 and fixed delay 20. The repetition frequency of sampling strobe 48 determines the basic operating frequency of the tracker system, and may be chosen to meet the demands placed on the system. Sampling strobe 48 may be an 8 KHz pulse generator if a 125 microsecond sampling interval is set.

A tracking strobe 46 is coupled to strobe delay 44 and to tracking logic network 34 to drive both of these devices at a rate substantially higher than the sampling rate. If the sampling strobe frequency is set at 8 KHz, the tracking strobe frequency, for example, may be set at 64 KHz.

In operation, tracking strobe 46 pulses the output of tracking logic network 34 into reversible counter 42 at a rapid rate. Delays of integral numbers of sample periods, that is for example, of 125, 250, 500 . . . microseconds are immediately read into coarse delay 38. Delays of less than a single sampling period (e.g., 62, 31 or 16 microseconds) are read into strobe delay 44. Strobe delay 44, which is coupled to fine delay buffer 40 and to fixed delay 22 delays the input from sampling strobe 48 by the interval registered in reversible counter 42, than passes the delayed strobe pulses to the fine delay buffer 40 and fixed delay. Thus, the strobe delay controls the phase during a particular sampling period at which information is read into fine delay buffer 40 and fixed delay 22.

In practice it has been found that the four lowest order digits of reversible counter 42 are not required in the fine delay because the delay increments they represent are below the standard deviation of the tracking system.

The system may be further refined to more accurately track sonic sources moving at rapidly varying rates by accumulating the output of tracking logic network 34 in a second reversible counter 50, and using the number in this counter to control the rate at which additional delay changing commands are fed from the tracking logic network 34 to the reversible binary counter 42. Thus, if an excess of commands is produced by the tracking logic, the count in the secondary or rate counter increases until it is producing extra commands at exactly the rate required to keep up with the delay changes caused by the rapid target movements.

Obviously numerous modifications and variations of the present invention are possible in light of the above teachings. It is therefore to be understood that within the scope of the appended claims the invention may be practiced otherwise than as specifically claimed herein.

What is claimed as new and desired to be secured by Letters Patent of the United States is:

1. An automatic signal delay tracking system comprising:
   first and second means for sampling and clipping first and second input signals respectively;
   adjustable delay means connected to said first sampling and clipping means for delaying samples of said first input signal a selectable interval;
   means connected to said second sampling and clipping means for comparing said first and second input signals for coherence and producing at least two output signals;
   logic network means connected to said comparing means for determining a relationship between said output signals, said logic network means connected to and automatically controlling said adjustable delay means in response to said output signals; and
   means connected to said logic network means for scanning through a range of adjustable delay values to search for possible targets.

2. An automatic signal delay tracking system as in claim 1 wherein:
   said comparing means includes first and second delay means for delaying all inputs a fixed interval; and
   a plurality of $\overline{EX\ OR}$ gates interconnected with said first and second delay means.

3. An automatic signal delay tracking system as in claim 2 wherein:
   said plurality of $\overline{EX\ OR}$ gates includes a first $\overline{EX\ OR}$ gate connected to the input of said first delay means, and to the output of said second delay means; and
   a second $\overline{EX\ OR}$ gate connected to the input of said second delay means and to the output of said first delay means.

4. An automatic signal delay tracking system as in claim 2 wherein:
   said plurality of $\overline{EX\ OR}$ gates includes a third exclusive OR gate connected to the inputs of both said first and second delay means.

5. An automatic signal delay tracking system as in claim 1 wherein said adjustable delay means includes interconnected coarse and fine delay means.

6. An automatic signal delay tracking system as in claim 5 wherein said coarse delay means is connected to and controlled by a reversible binary counter.

7. An automatic signal delay tracking system as in claim 5 wherein said fine delay means includes
   fixed frequency strobing means,
   strobe delay means connected to said fixed frequency strobing means for selectively delaying the output thereof; and
   reversible binary counting means connected to said strobe delay means for controlling the delay produced thereby.

8. An automatic signal delay tracking system as in claim 5 further comprising:
   rate counting means connected to said logic network means for regulating the output thereof.

* * * * *